Figure 1:
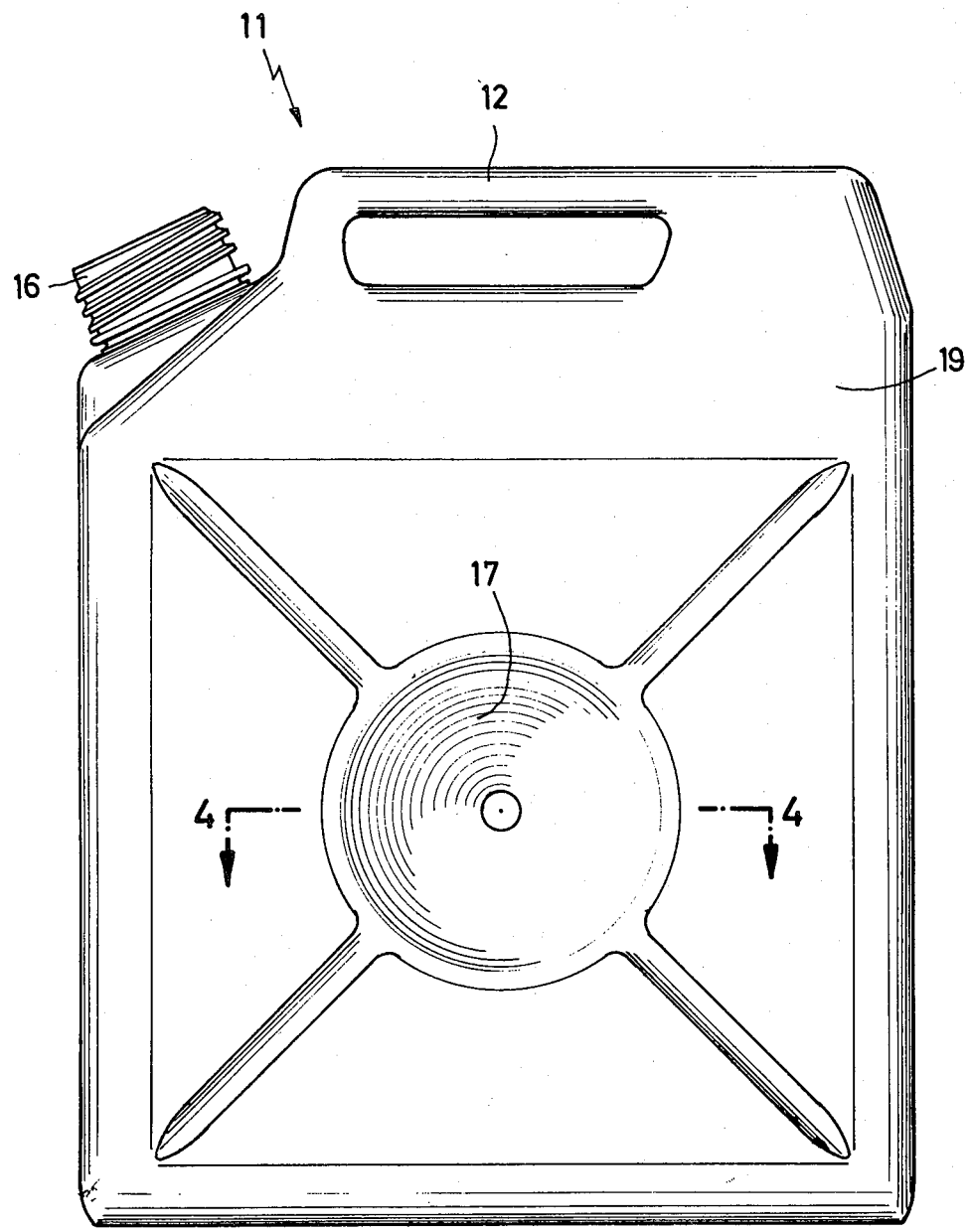

United States Patent [19] [11] 3,898,310
Schiemann [45] Aug. 5, 1975

[54] METHOD FOR MANUFACTURING LARGE PLASTIC JERRY CANS

[76] Inventor: Dr. Wolfram Schiemann, Eugen-Nagele-Strasse 17, 714 Ludwigsburg, Germany

[22] Filed: Apr. 3, 1973

[21] Appl. No.: 347,572

[30] Foreign Application Priority Data
Apr. 6, 1972 Germany............................ 2216524

[52] U.S. Cl. ................... 264/94; 264/248; 264/249; 264/261; 264/273; 425/503; 425/DIG. 214
[51] Int. Cl.²...................... B29C 17/07; B29D 3/02
[58] Field of Search ............. 264/89, 90, 92, 94, 96, 264/97, 98, 99, 248, 249, 261, 263, 273, 274; 425/DIG. 203, DIG. 214, 503, 504; 220/94 A; 215/1 C

[56] References Cited
UNITED STATES PATENTS

| | | | |
|---|---|---|---|
| 2,300,594 | 11/1942 | Rehfeld............................ | 264/273 X |
| 2,366,274 | 1/1945 | Luth et al. ...................... | 264/263 X |
| 2,959,812 | 11/1960 | Allen ................................ | 264/98 X |
| 3,479,421 | 11/1969 | Armbruster et al. ................. | 264/98 |
| 3,535,411 | 10/1970 | Bowles................................ | 264/98 |
| 3,575,949 | 4/1971 | Humphrey ........................... | 264/94 |

*Primary Examiner*—Jan H. Silbaugh

[57] ABSTRACT

Plastic jerry cans are formed from a pair of injection-molded surface-stabilized, low warpage plastic shells having high diffusion tightness and low surface resistance to electrical conduction. A contiguous plastic inner wall is blow-molded from the inside of the shells and is fused onto the interior surface of the shells. The inner wall seals the shell halves together at the flat bottom of cone-shaped inward dips on the large side surfaces of the shells.

10 Claims, 5 Drawing Figures

METHOD FOR MANUFACTURING LARGE PLASTIC JERRY CANS

The invention covers a method for manufacturing plastic jerry cans intended mainly for easily combustible liquids.

So far, attempts to reproduce the 20-liter three-handle military steel jerry can in plastic have not been successful, even though plastic has been around a very long time. There are a number of reasons for this:

1. The jerry cans must be sufficiently diffusion tight. This means that during a certain time interval and within a certain temperature range, only so much fuel may diffuse (permeate) out of the jerry can. Together with the air, the fuel forms a combustible mixture which may ignite while handling the jerry cans. According to German safety regulations, the diffused fuel quantity per can may not exceed a certain amount, the size of the can notwithstanding. The diffused quantity of fuel depends on wall thickness and container surface. Since smaller cans have a smaller surface, there is less diffusion than permissible. However, with larger cans, in particular 20- and 30-liter cans, the surface is so large that, when using standard low-pressure polyethylene, too much of the contents may diffuse if the jerry can is filled with evaporating fuel.

2. While being shipped, jerry cans rub against each other. Electrostatic charges are caused. If the surface (skin effect) resistance of the can's material is too large, these charge potentials cannot be conducted away. Then the charges cannot be balanced quickly and sparkovers may develop while pouring, e.g., from the gas tank to the jerry can. These sparks may initiate explosions.

3. The jerry can must be able to withstand great temperature differentials. Plastic jerry cans which are only direct copies of the well-known steel three-handle jerry can will expand like a balloon at approx 70°C ambient temperature because an overpressure builds up inside.

4. The jerry cans must be formed so that they may be dropped suspended by their three handles, e.g., from a parachute, without having the opening jerk of the parachute damage the jerry can.

5. The jerry cans must be such that they do not burst at any point if dropped at low temperatures from a height of several meters onto a concrete surface.

6. The shape of the jerry can must allow for the fact that there already exist very many mountings, pallets, storage areas, etc. which fit the 20-liter steel jerry can and which also must fit the plastic jerry can. The list of these requirements could be extended further.

Even though it is well-known that plastic cans can be manufactured easier thn those of steel, there is not yet available a good 20-liter plastic jerry can with three handles. It is also known that the plastic jerry cans do not have to be painted on the in- or outside after several years, so that these costs are saved. The costs arising from recycling steel cans constitutes a considerable share of the price of a new can. The ratio of recycling cost to purchase price for steel jerry cans is 1:4.

It is also known that plastic jerry cans can be manufactured at greatly reduced cost. This would be very important in the case of a mass-produced article.

There have been many attempts and experiments to combine diffusion tightness with antistatic properties and to attain adequate form stability. However, all these attempts have failed because they did not succeed in simultaneously controlling all parameters.

The purpose of this invention is to provide a method which solves all outstanding problems and by which, in addition to containers of any type, e.g., fuel tanks for automobiles, 20- and 30-liter jerry cans can be manufactured.

For solving this problem, the invention's method provides the following steps:

a. At least two shells conforming to the shape of the jerry can are formed from a surface-stabilized, low-warpage material of sufficiently high diffusion tightness and sufficiently low skin effect resistance.

b. The shells are placed in a blow form half each.

c. With the blow form halves closed, a contiguous wall is blown from the inside onto the interior surfaces of the shells.

d. Both for the shells and the blown material, a heat seal material is used.

Figure 2:
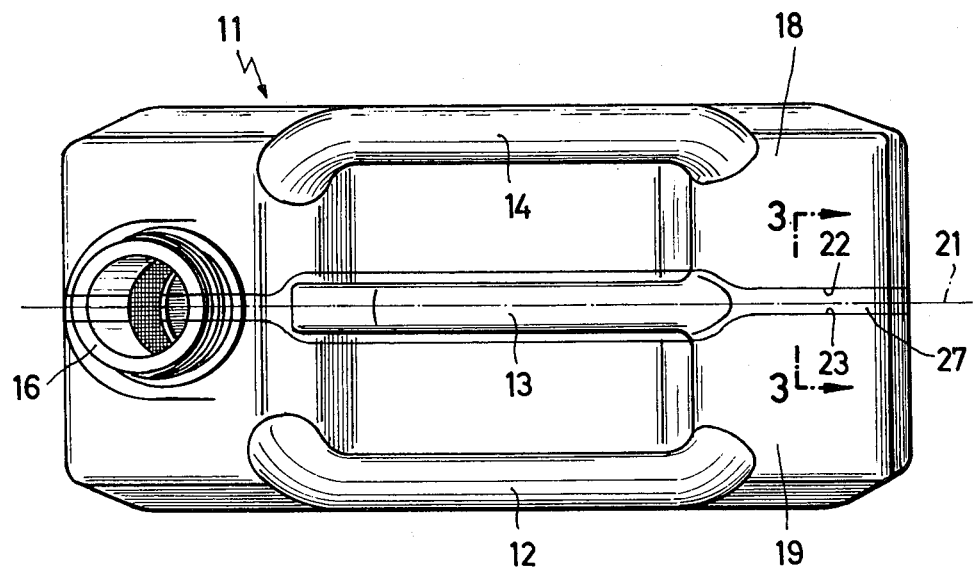
Figure 3:
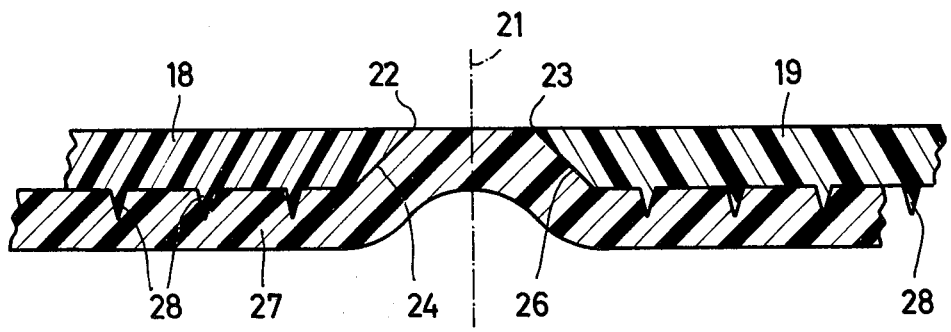
Figure 4:
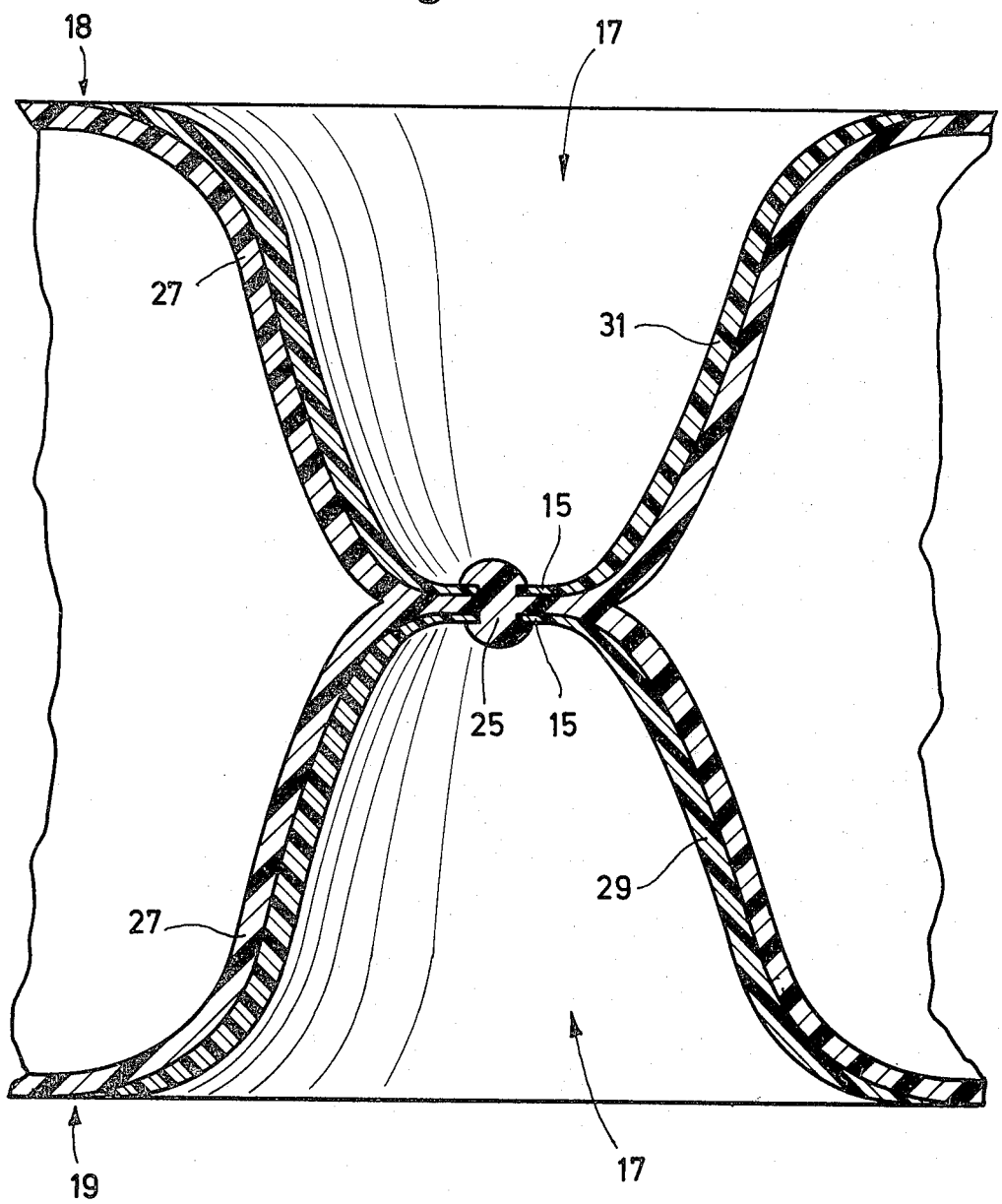
Figure 5:
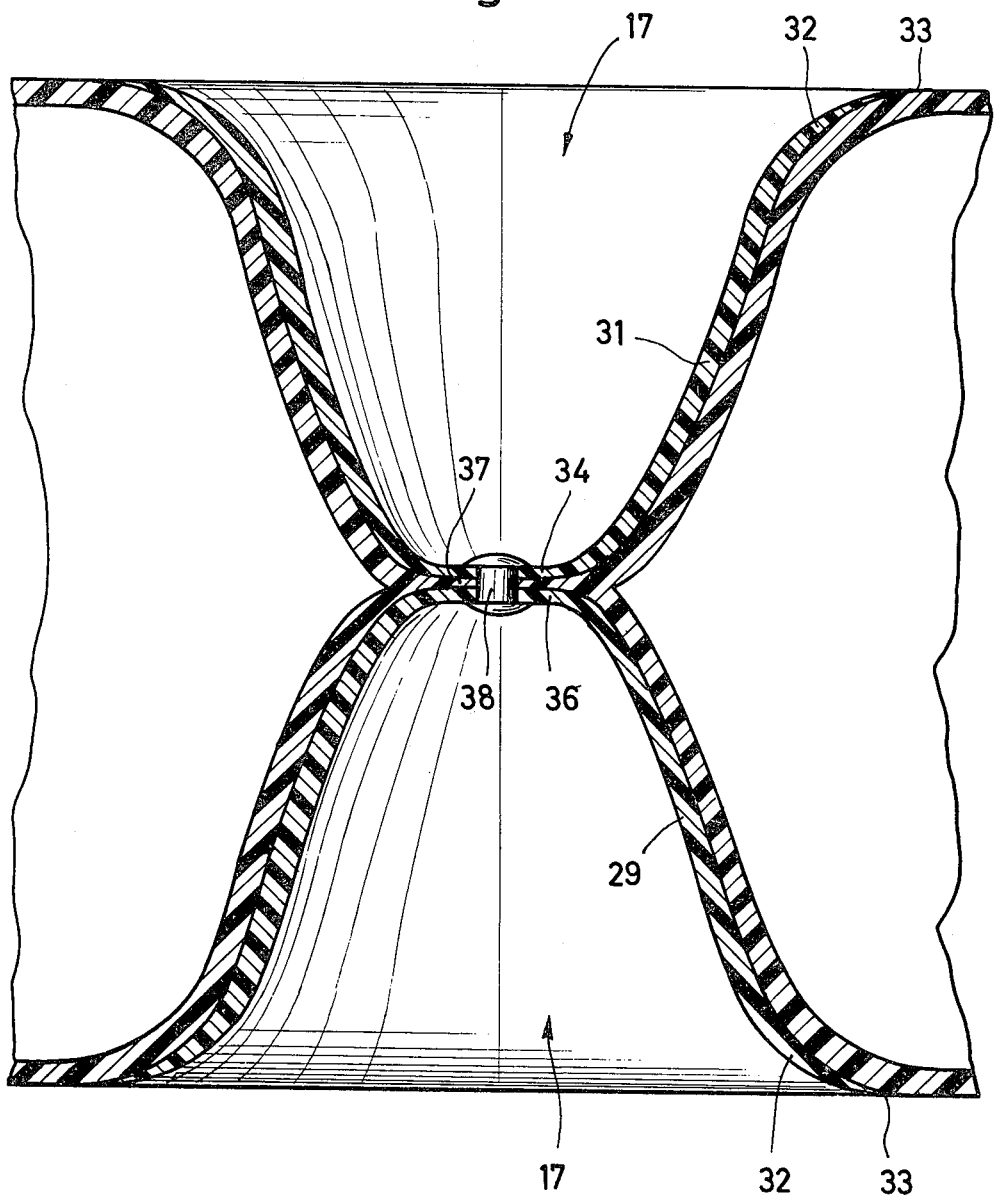

Further advantages and characteristics of the invention are contained in the following description of preferred examples: The drawings show the following:

FIG. 1 side view of a 20-liter jerry can with screw cap,

FIG. 2 top view of jerry can of FIG. 1,

FIG. 3 section along line 3—3 in FIG. 2,

FIG. 4 section along line 4—4 in FIG. 1 for a different design,

FIG. 5 section along line 4—4 in FIG. 1 for yet another design.

A 20-liter military type jerry can 11 of polyethylene has three handles 12, 13, 14 and spout 16, e.g., with external threads. One could also use the conventional ball clip or ring cap. Near the intersection of the diagonals on the large side surface of jerry can 11 there is provided a cone-shaped dip 17 which extends so far that it touches the opposite wall and can provide the basis for a solid connection yet to be described.

Jerry can 11 has two shells 18, 19 located symmetrically relative to the center plane 21 of the jerry can. Handle 14 has been molded onto shell 18, and handle 12 is molded onto shell 19. Edges 22, 23 of shells 18, 19 terminate shortly before center plane 21 and even recede somewhat near handle 13. Edges 22, 23 have a chamfer 24, 26 facing the inside. An extruded hose 27 with its outside heat sealed to the interior surface of shells. To accomplish better fusion, shells 18, 19 on their inside have numerous small cones 28 which might cut into the outer surface of hose 27 but do not penetrate hose 27. Hose 27 appears on the outside only in the area between edges 22, 23 and, because of chamfers 24, 26, can conform well and there are no transition difficulties.

In manufacture one first forms shells 18, 19 with handles 12, 14 and the cone-shaped inversion. The die casting method is used. With this method, the die mold is not completely closed by several tenths of a milimeter, the hollow space is injected and after the injection the mold is closed completely. This packs the material in the mold and it becomes more inherently stable, true to size and diffusion-resistant, than thermoplastic or extrusion material injected in the conventional manner. In most cases the die-casting pressure is 15 atmospheres above gauge and more. The material is a polyethylene type with a surface (skin effect) resistance considerably below $10^9$ ohms. It is preferable to use a material with a surface resistance of 10⁶ ohms. After die-casting the shells 18, 19 are heated to about 110°C. Then each shell is placed in one half of a blow mold. Jerry cans are always blown upside down with the spout 16 serving as inlet for the blow spindle sleeve. Now hose 27 is blown by the conventional blowing method so that in the hot state it conforms to shells 18, 19 from the inside. Cones 29, 31 are enveloped by the paraffin-like skin of hose 27 and welded together. Hose 27 likewise consists of polyethylene, but one that is particularly diffusion tight. The size of shell 18, 19 may attain the dimension up to half of a jerry can. Shells 18, 19 contain handle 12 or 14, respectively, and the cone-shaped dip 17 in the form of a blind-end hole. In the example shown in FIG. 4, dip 17 in bottom surface 15 has a hole 20. This hole 20 must be large enough that hose 27, which seals the two symmetrical shells 18, 19 together, can pass through the hole in bottom 15 of dip 17 and hence effects a rivet head like sealing (welding) 25 of dips 17. The interior surfaces of dips 17 are roughened heavily. They may, however, also be provided with sharp points. The purpose of the dip 17 is to prevent balloon-like expansion in case of a temperature effect on the jerry can filled with evaporative fuel.

For another example in FIG. 5, shells 18, 19 are reduced to two truncated cones 29, 31. Through fillet 32 they turn into the outside wall of the jerry can and terminate toward the edge in a thin point 33, thus accomplishing smooth transition. The two truncated cone flats 34, 36 are sufficiently apart to accommodate sufficient hose material 37. In this connection it should be pointed out that this invention never uses material less than 1 mm thick. Rather, the wall thicknesses are such that they can withstand rough usage. The total wall thickness for a 20-liter jerry can is 5–10 mm. The wall thicknesses may be apportioned half to the hose material and half to the injected material. It is not the purpose of the truncated cones 29, 31 to reduce the surface (skin effect) resistance and the diffusion. Their purpose is to make the blown wall of the jerry can in this area more inherently stable. If dip 17 is produced only during blowing, it can happen that hose material 37 fuses but turns out too thin because of excessive expansion, i.e. stretching of the hose material. To prevent this, injection molded shells are used. The forces to be absorbed here may be very large. For instance, in a gasoline can at 75° C the internal pressure is 3.5 atmospheres above gauge (1 atmosphere = 1 kg/cm²).

FIG. 5 indicates that the truncated cones are rather slender. As a result, they take as little room as possible from the jerry can interior. In addition, the sidewalls of dips 17 are aligned better so that they are stressed essentially under tension only. This is the type of stress under which synthetic material holds up very well.

The truncated cone flats are just large enough to accommodate the rivet heads of of the two-head rivet connection 38. The shank of the two-head rivet connection has a relatively large diameter.

Dips 17 of the two shells 18, 19 are identical for the first example.

The center handle 13 is made of hose material and can be manufactured by a procedure as described in French Patent No. 7,018,685.

Regarding diffusion tightness it should be pointed out that the hose material bears the major burden and that the shell material only furnishes the remainder of the required diffusion tightness. One should also mention that hose 27 must be made of thermoplastic material, while shells 18, 19 may be from thermoplastic or thermosetting or glassfiber reinforced synthetic. The only requirement is that the hose material can be fused to the shell material.

What is claimed is:

1. Method for manufacturing large plastic jerry cans for easily combustible liquids comprising
   A. injection molding two slender truncated cones conforming to the shape of the jerry can from a surface-stabilized, low-warpage plastic material of surface resistance considerably below 10⁹ ohms, forming holes in the truncated end-portions thereof, and smooth, outwardly-turned edge-portions thereon, and roughening the inner surface thereof,
   B. preheating the truncated cones,
   C. placing each truncated cone entirely enclosed in a blow form half section to project inward at the large face of the large jerry can to be molded,
   D. positioning highly diffusion-tight thermoplastic hose material, at least 1 mm in thickness, between said truncated cones in said blow form half sections.
   E. closing the blow form half sections with the truncated cones spaced apart in the closed position of said blow form half sections and said hose material filling the space between said truncated end-portions in the closed position,
   F. blowing and heat sealing a large contiguous wall of said hose material from the inside onto and around the interior surfaces of the truncated cones with the blow form halves closed, smoothly transitioning the edge-portions of the truncated cones into the hose material, and
   G. fastening the truncated cones to each other with the blow molded hose material filling the space between the truncated end-portions of the cones by forming rivet-like means through the holes formed in the truncated end-portions of each cone.

2. Method according to claim 1 comprising injection molding the truncated cones by die-casting method.

3. Method according to claim 1 comprising injection molding the truncated cones with material having a high diffusion density.

4. Method according to claim 1 comprising heating the truncated cones to approximately 110°C.

5. Method according to claim 1 comprising injection molding the truncated cones with handles in one piece.

6. Method according to claim 5 comprising molding each truncated cone of a three-handle jerry can with at least an outer handle.

7. Method according to claim 1 comprising forming said rivet-like means by pressing said blow molded hose material through said holes in said truncated end-portions.

8. Method according to claim 7, comprising forming a rivet-headlike fused joint of said blow molded hose material through said holes in the truncated cones which are aligned with each other.

9. Method according to claim 1 comprising forming said rivet-like means by placing the shank of a plastic rivet protruding through said holes in said truncated end-portions and forming rivet heads on the protruding parts of the shank.

10. Method according to claim 1 comprising forming said rivet-like means by inserting rivet-like means into said holes in said truncated end-portions of the truncated cones and forming rivet head-like means on said rivet-like means to fasten said truncated cones to each other.

* * * * *